(12) United States Patent
Zoheir et al.

(10) Patent No.: US 9,208,253 B2
(45) Date of Patent: Dec. 8, 2015

(54) EFFICIENT TRANSFER OF WEB CONTENT TO DIFFERENT USER PLATFORMS

(75) Inventors: Amr Zoheir, Piscataway, NJ (US); Sajid Ahmed, Monmouth Junction, NJ (US); Adil Belihomji, Kendell Park, NJ (US); Mary Pearl Jelinek, Somerset, NJ (US)

(73) Assignee: Cellco Partnership, Basking Ridge, NJ (US)

(*) Notice: Subject to any disclaimer, the term of this patent is extended or adjusted under 35 U.S.C. 154(b) by 340 days.

(21) Appl. No.: 13/292,754

(22) Filed: Nov. 9, 2011

(65) Prior Publication Data

US 2013/0117351 A1    May 9, 2013

(51) Int. Cl.
G06F 15/173    (2006.01)
G06F 17/30    (2006.01)
H04L 29/08    (2006.01)

(52) U.S. Cl.
CPC ........... *G06F 17/30905* (2013.01); *H04L 67/02* (2013.01)

(58) Field of Classification Search
CPC ...................................................... H04L 67/02
USPC .......................................................... 709/203
See application file for complete search history.

(56) References Cited

U.S. PATENT DOCUMENTS

| | | | | |
|---|---|---|---|---|
| 6,430,624 B1* | 8/2002 | Jamtgaard et al. | ............ | 709/246 |
| 6,990,629 B1* | 1/2006 | Heaney et al. | ................ | 715/200 |
| 7,349,955 B1* | 3/2008 | Korb et al. | ..................... | 709/219 |
| 2002/0093529 A1* | 7/2002 | Daoud et al. | ................... | 345/745 |
| 2007/0011182 A1* | 1/2007 | Chiu | ............................. | 707/101 |
| 2007/0100648 A1* | 5/2007 | Borquez et al. | ................... | 705/1 |
| 2008/0235573 A1* | 9/2008 | Serdy et al. | .................... | 715/239 |
| 2012/0089669 A1* | 4/2012 | Berg et al. | ..................... | 709/203 |
| 2013/0086146 A1* | 4/2013 | Addala et al. | ................. | 709/203 |

OTHER PUBLICATIONS

"Model-view-controller," retrieved from Wikipedia on Nov. 8, 2011. <http://en.wikipedia.org/wiki/Model_view_controller>.

* cited by examiner

*Primary Examiner* — June Sison
*Assistant Examiner* — Steven Nguyen

(57) ABSTRACT

Web content for different user platforms is provided in an efficient way. A request is received for an identified page of content from a client device, through a communication network, at a computer system configured as an application server. The user platform implemented by the client device is identified, from among user platforms supported by the application server. A View of the identified page of content is retrieved from storage by a processor of the computer system. The View of the identified page of content is processed to in a format reproducible on the client device for presentation to a user via execution of the identified user platform. For example, the View of the identified page of content is transmitted through the communication network to the client device in JavaScript Object Notation (JSON) or Extensible Markup Language (XML).

22 Claims, 6 Drawing Sheets

EFFICIENT TRANSFER OF WEB CONTENT TO DIFFERENT USER PLATFORMS

BACKGROUND

In recent years, browsing the web on different user platforms has become commonplace. Different types and/or different generations of mobile stations and computers implement a variety of different browsers and related applications for the user interface to on-line content, including on-line stores. In order to accommodate these client devices, each user platform is provided a URL that is specific to the station's platform.

For many web-based applications, a server provides content for different user platforms. Each user platform may be a client device (i.e., android device, iphone, pc, etc.) or a web browser configured for a particular type of class of devices. Different types and/or different generations of mobile stations implement a variety of different browsers and related applications for the user interface to on-line content. The server provides content to the different user platforms by maintaining different html documents for each content (web page) it provides. For example, the server would maintain different html code for different user platforms for the same "home" page. This approach required the sending of a substantial amount of information (via html) to the user platform, slowing down communication. Further, it required the administration/maintenance of different html documents for each type of user platform, for every content item the server(s) may offer.

Hence a need exists for a way to provide browser content to all different user platforms in a compatible format that is easy to maintain and efficient to transport.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings.

The various examples discussed below enable an application server to provide content for a web-based application, tailored to different user platforms, in an efficient way. The application server maintains a "View" for each web page (a View essentially represents a web page). A View comprises different user interface (UI) components. For example, a component could be a picture, an mp3 file, etc. A View is adapted to some number of the different platforms of the client devices that can receive web content from the application server. After there is a request from the client (on their respective user platform) for a web-page, the application server identifies the platform used by the client. Based on the identification, the application server provides a tailored "View" for that particular platform and sends the "View" to the client. For example, the application server may provide a View having 20 components for an Android client device or a View having 4 components for an iPhone client device.

Generally, web content may be provided in a centralized, consistent, dynamic, fast-rendering manner that may be easy to maintain and easily configured for different user platforms. Many different web sites and/or services using such sites deliver web content. For example, the Media Store On Devices (MSOD) is a system that delivers pages and related content of a Media Store onto many user platforms (i.e., PCs, Tablets, PDA's, and cell phones with their respective browsers). When user platforms are added, the Media Store has the capability of taking advantage of the browser feature each client device provides. Thus, instead of providing a single page to accommodate all the different platforms based on the simplest platform, where a web page may look primitive on more advanced platforms, the Media Store provides content tailored to the particular platform in an efficient way, without using much overhead on the content provider side. Such configuration allows changes to the web content to be made easily, without the need for maintaining different html files for different user platforms.

Figure 1:
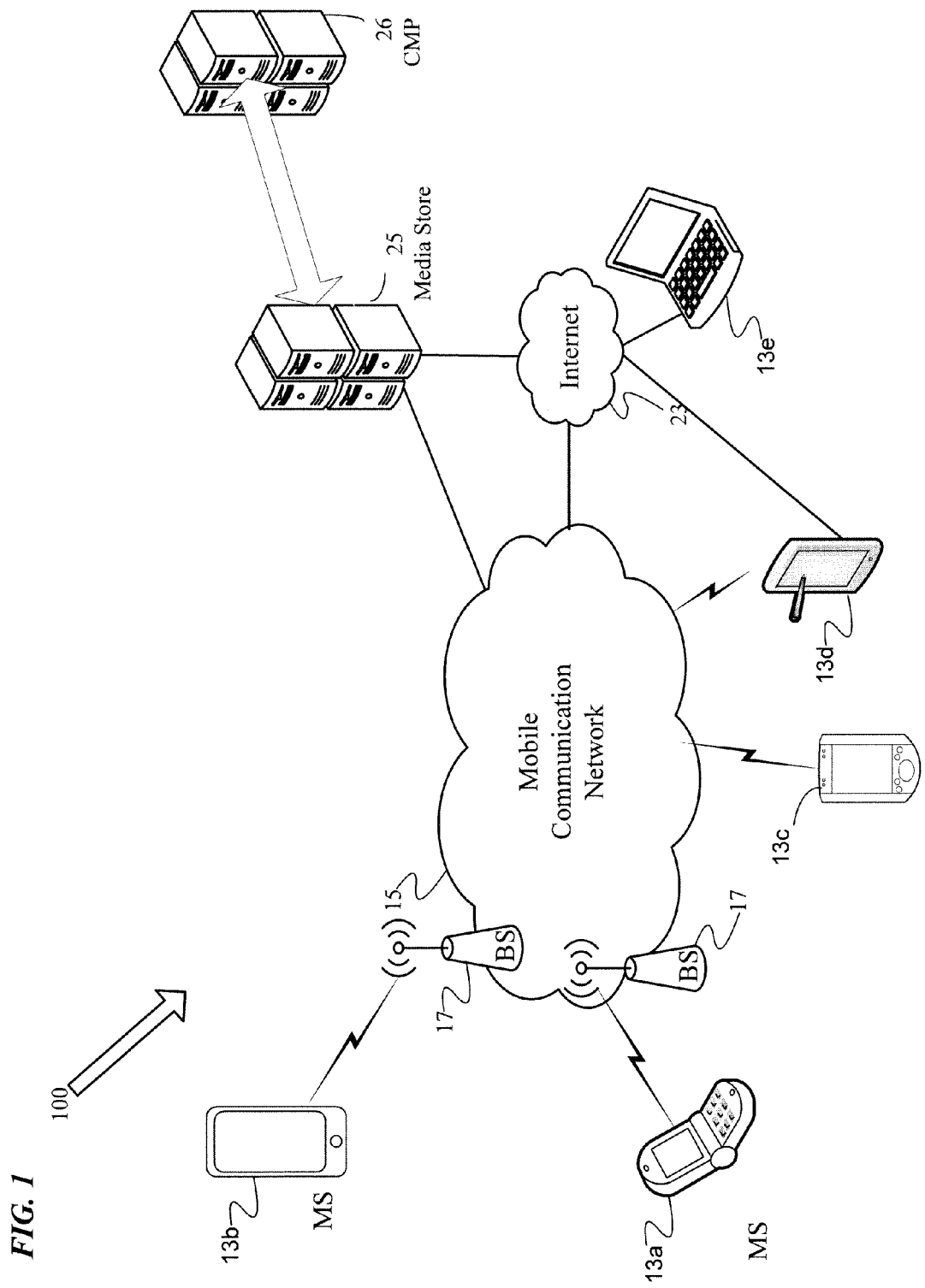
FIG. 1 illustrates a system providing a framework to present web content to various user platforms.

Reference now is made in detail to the examples illustrated in the accompanying drawings and discussed below. FIG. 1 illustrates a system 100 providing a framework to present web content to various user platforms, in accordance with certain aspects of the present disclosure. The example shows several mobile stations (MSs) 13a, 13b, 13c, 13d, a personal computer 13e, and a mobile traffic network 15. The stations 13a, 13b, 13c, 13d, and 13e are examples of user platforms that may be used for a variety of communication functions, including for purposes of this discussion, to obtain content from a content provider, such as Catalogue Management Platform (CMP) 26 through a Media Store 25. However, the network will provide similar communications for many other similar user platforms that do not use the on-line Media Store 25 content. The network 15 provides mobile wireless communications services and content to those stations as well as to other mobile stations (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion here.

The network 15 allows users of the mobile stations such as 13a, 13b, and 13c (and other mobile stations not shown) to initiate and receive telephone calls to each other. The network 15 typically offers a variety of data services via the Internet 23, such as downloads, web browsing, email, etc. By way of example, the drawing shows a laptop PC type user terminal 13e as well as an application server 25 connected to the Internet 23. The data services for the mobile stations 13a-d via the Internet 23 may be with client devices like those shown at 25 and 13e as well as with a variety of other types of client devices or systems capable of data communications through various interconnected networks. Such data services may include services which allow the user of the mobile station to download and obtain on-line content.

For purposes of a representative example, the drawings show and we will discuss a mobile network 15 and a Media Store 25 as the example of a web-based service where the mobile network carrier operates the application server computer(s) 25 that provide an on-line store, where the computers of the on-line store service implement the methods of handling web content for different user platforms. Although some of the terms used below may be specifically applicable to that Media Store example, the present teachings are applicable to other on-line content distribution services and to other on-line searches that deliver web content to different user platforms. Communications between the application server computers and the various user platforms may utilize any available network or combination of networks capable of transporting packet data for web type data services and/or associated content delivery services. Specific elements of the network 15 for carrying the voice and data traffic and for controlling various aspects of the calls or sessions through the network 15, for mobile client devices, are omitted here for simplicity.

Mobile stations 13*a-d* can take the form of portable handsets including feature phones, smart phones, and advanced phones. Program applications, including an application to browse and access multimedia content and/or any web information from the Media Store 25, can be configured to execute on many different types of mobile stations 13 and personal computer 13*e* specific to each client device's user platform.

Figure 2:
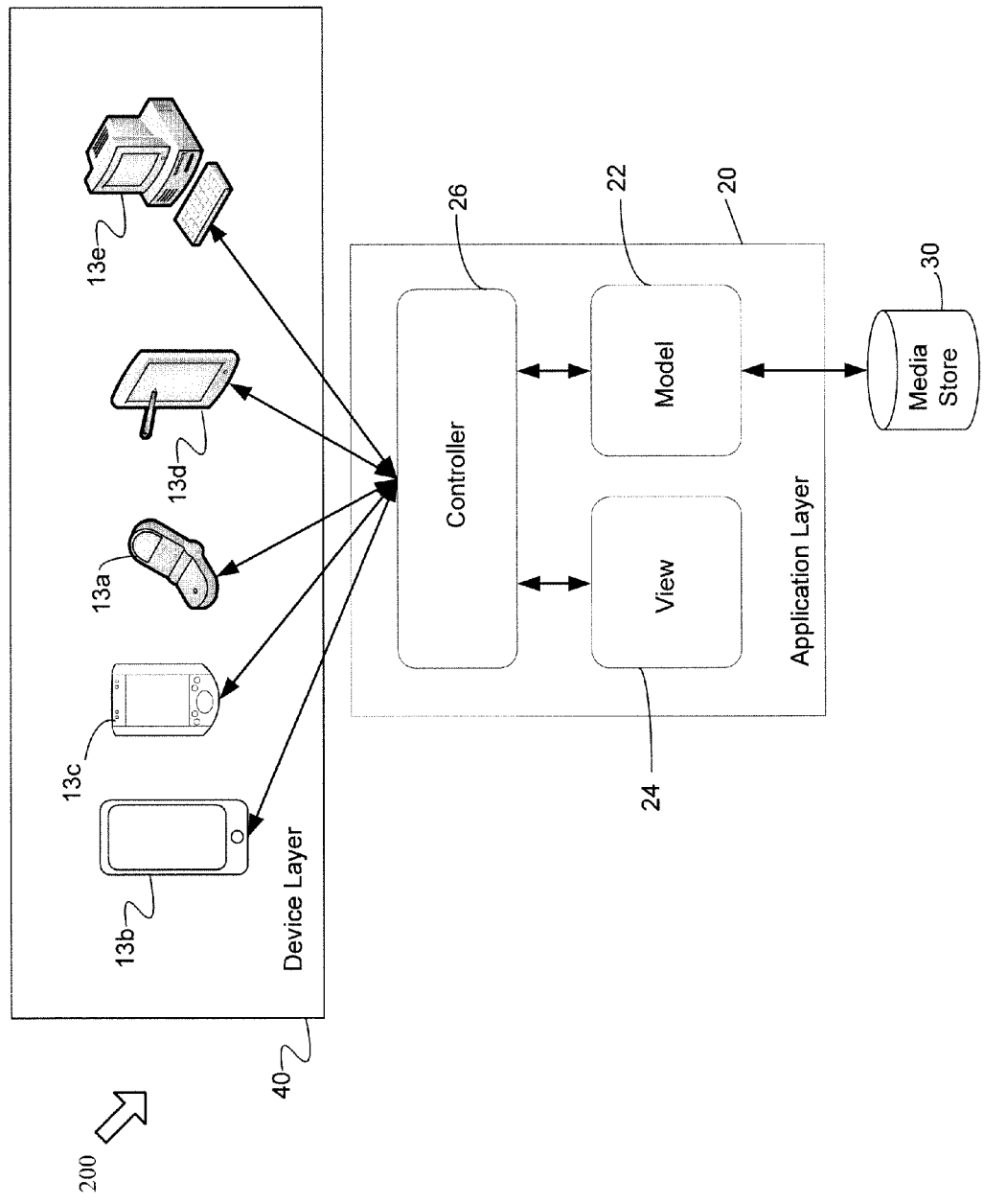
FIG. 2 illustrates the relationship between the device layer, application layer and a content provider.

FIG. 2 illustrates the relationship between the device layer, application layer and the exemplary Media Store. The Application layer 20 includes the architecture of a Model-View Controller (MVC), which isolates the "business logic" from the content (user data that is sent from the Media Store 30) and the Presentation Layer (part of the graphical user interface (GUI) of the device layer 40). This separation between the different layers provides for the independent development, testing, and maintenance of each layer.

The Model 22 manages the behavior and data of the application domain, responds to requests for information about its state (e.g., from the View 24), and responds to instructions to change state (e.g., from the Controller 26). Managing the behavior by Model 22 includes deciding what user interface (UI) components should be visible and sent to the client device. For example, the number and type of UI components sent to the clients may vary based on the customer profile and/or whether the user is signed in to a service. In one example, the Model 22 is encapsulated in an X Layer (discussed later) with support from the Catalog Management Platform (CMP) real-time application programming interfaces (APIs). For communication between the Model 22 and the Controller 26, JavaScript Object Notation (JSON) is used. JSON is a lightweight text-based open standard for human-readable data interchange. It is used for serializing and transmitting structured data over a network connection. It is used to transmit data between the Media Store 30 and the device layer 40, providing a more efficient alternative to html. Although JSON is used in the exemplary embodiment, other formats, such as Extensible Markup Language (XML) can be used as a means of communication between the device layer and the application layer.

For example, the Model 22 comprises a collection of user interface (UI) components, where each UI component contributes to rendering a specific UI widget (e.g., a List, a Grid, etc.). All UI components adhere to the same "interface." An interface is similar to a "contract" since all the UI components adhere to this contract. Each UI component includes two elements: (1) a configuration part, and (2) a data element. As to the configuration element, its metadata includes any customization information with respect to the default implementation of the UI component. As to the data element, it includes the raw data to be displayed on the Presentation Layer of the Device Layer 40.

Each UI component resides on the Media Store 30 server in Java. The UI component is translated on the device layer 40 (i.e., the client) as a single JavaScript Object. Although JavaScript is not an Object Oriented (OO) language, in our example, JavaScript is used in an OO methodology. The OO language is an architecture and programming paradigm that treats any system as a collection of objects. Each object has certain properties (e.g., encapsulation, hierarchy, etc.). In this regard, there are two sets of objects: at the device layer 40 in JavaScript and the Media Store 30 server side in JavaScript. Both sets of objects mirror one another.

The controller 26 of the application layer 20 receives input information and initiates a response by requesting information from Model 22 objects. The input information includes an HTTP Header name that indicates the user platform. The controller 26 accepts the information from the device layer 40, determines the user platform, and instructs the Model 22 and View 24 to perform actions based on the input received from the device layer. The Presentation Layer interacts with the particular device (i.e., 13*a*, 13*b*, 13*c*, 13*d*, or 13*e*) through a bridge. The bridge is discussed in a later section.

Figure 3:
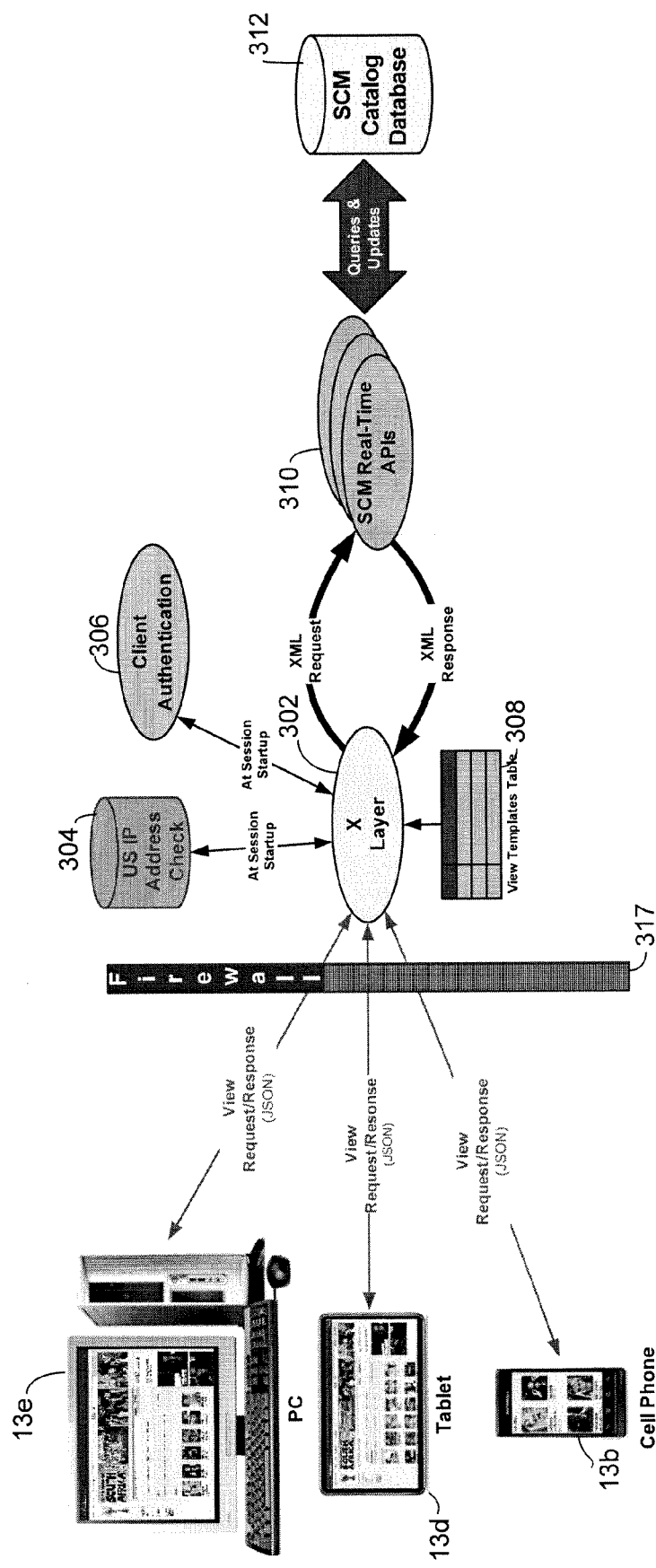
FIG. 3 illustrates the relationship between different components of a system that provides web content to various user platforms.

The View 24 queries the Model 22 via the Controller 26 in order to render the Model 22 into a form suitable for interaction with the device layer. The View 24 obtains its data from the Model 22. In some embodiments, the Controller 26 may issue a general instruction to the View 24 to render itself. In other embodiments, the View 24 is automatically notified by the Model 22 of changes in state for which a screen update is to be performed. Multiple Views can exist for a single Model 22 for different purposes. For example, the same content can be provided in different Views (e.g., as a list, grid, "UI widget," tab, etc.) for different user platforms. A View typically has a one-to-one correspondence with a display surface and is configured to render it. In one embodiment, Views are defined in the View Templates Table 308, as illustrated in FIG. 3.

The View Templates Table 308 contains View details for each device group (i.e., user platform). For example, every time a client device (e.g., 13*b*, 13*d*, 13*e*) makes a View request, the X Layer consults the View Template Table 308 to determine how to respond to the request. The View Template 308 includes support for a top down hierarchy. In one embodiment, the hierarchy includes a Device Group, View Template Set, View, SubView, UI Component Set, UI Component Attribute Set, and UI Component Attribute Values. The elements of the hierarchy are described in more detail below:

Device Group:

For example, each supported client device is assigned to a Device Group. All client devices in a group have similar UI characteristics.

View Template Set:

In one embodiment there are a set of supported Views for each Device Group (i.e., user platform). Different Device Groups may support a different number of Views. For example, the View requested by the client device (e.g., 13*b*, 13*d*, 13*e*) is one of the supported Views for its group.

View:

For example, a single View can be described as an entire browser page to be displayed on the Presentation Layer 410 (discussed later). Each View comprises several attributes. For example, some attributes are the View ID, the View Name (e.g., Album Page), the Cascading Style Sheet (CSS) Base Class (which provides the style information), and the type of View (e.g., New—the old View is replaced with this View; Update—the existing View is updated using information in this View; Overlay—this View is displayed over the View currently displayed (e.g., a pop-up)). An additional attribute of the View includes the SubView Array. This lists the Sub-Views (if any) that are used in the View. Yet another attribute of the View includes the UI Components Array, which is a list of UI Components.

SubView:

In one embodiment, a View is made up of one or more SubViews. The SubViews comprise some of the UI components of the complete View. For example, standard screen headers and footers are two SubViews. All the SubViews are joined to create the final View that is displayed through the Browser. In one example, SubViews come in different "flavors." On a page with several tabs, each tab and its associated data can be considered a "flavor" of the same SubView. For example, the Ringtones, Ringback Tones, and MP3 tabs on the Media Store home page are "flavors" of the SubView. This is just one of the several SubViews that comprise the page (i.e., complete View).

UI Component Set:

In one example, each View or SubView comprises a set of UI Components. Different Views and SubViews include a different set of UI Components.

UI Component Attribute Set:

In one example, each UI Component has a different set of parameters that define it.

UI Component Attribute Values:

In one example, the same UI Component attribute has different values for different Views.

FIG. 3 illustrates the relationship between different components of a system that provides web content to various user platforms, separated by a firewall 317. The system includes Selected System Configuration Management (SCM) real-time APIs 310. These act as an interface between the X Layer 302 and the SCM Catalog Database 312 (i.e., storage). It processes the request from the X Layer 302 (originally from the device layer) to obtain information from the SCM Catalog Database 312.

Each page displayed on a browser includes at least one View. When the X Layer 302 queries the View Template Table 308 with criteria for a certain user platform, it is provided information from the SCM Catalog Database 312 via the SCM Real-Time APIs 310, to send to the Presentation Layer. For example, if a View also contains one or more SubViews, that information (and all of the information regarding the SubViews), is sent to the Presentation Layer. The information is sent in the form of JSON. It contains JavaScript that is used to build the individual UI Components.

Accordingly, any page can be easily created regardless of the size or the capabilities of the browser. For example, if one browser includes a feature that another browser lacks, the UI Component for this feature will only be sent to the user platform that can support it. If a new feature is added to a page, the change is added to the View Template Table 308. Again, only the table for the user platforms that include browsers that support the added feature is modified. The ability to manage the web content centrally allows for rapid enactment of changes to visual designs, including style, content, colors, logo, menu items, layout of navigation menus, promotional messages, advertisements, and other content, without IT teams providing separate html code for each user platform. Thus, changes to the web content may automatically be provided to different user platforms, without otherwise having to invest in additional substantial effort in creating separate html code for each different user platform, resulting in minimal maintenance effort for a web page, while providing the content that best accommodates each user platform individually. Accordingly, modifications in a single central location may allow a company to forego expensive integration efforts on an ongoing basis with multiple vendors and associated parties and affiliated web sites, reducing the cost of doing business while improving the time it takes for changes to be implemented.

As discussed before (and as indicated in the device layer 40 of FIG. 2,) different user platforms of the device layer are supported. For example, PCs, Tablets, PDA's, and cell phones can interface with the application layer 20 to obtain information from the Media Store 30.

Figure 4:
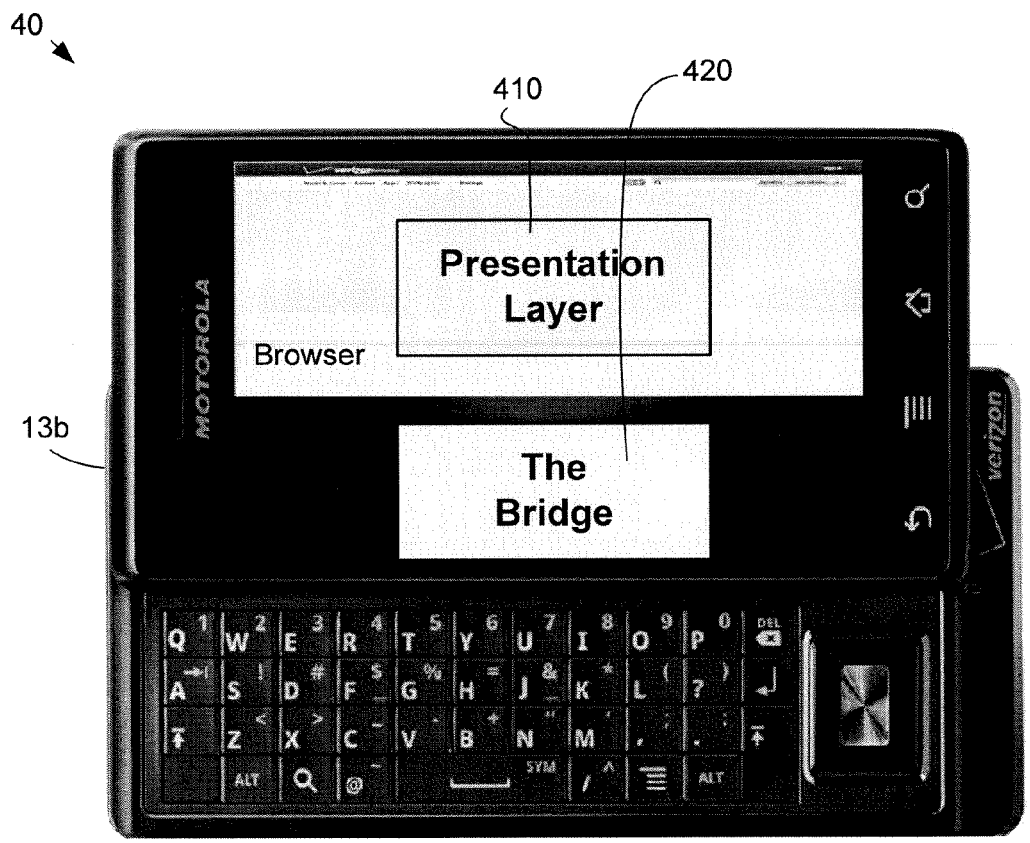
FIG. 4 is an exemplary device providing a bridge layer and a presentation layer.

One such exemplary user platform is illustrated in FIG. 4, which provides a closer view of a smart-phone 13b. The device layer 40 includes a Presentation Layer 410 and a bridge 420. The Presentation Layer 410 runs as an application in the browser and the bridge 420 runs as an application on the device 13b. The Presentation Layer 410 represents software that runs on the device layer 40 and interacts with the user. It is a rendering engine that responds to display instructions (in the form of Views) sent from the X Layer to the device 13b based on instructions contained in the Views. The bridge 420 represents software that can interact with the particular client device 13b. For example, the Presentation Layer 410 can call the bridge 420 for a direct link to the client device's 13b operating system. By way of example, if content (e.g., ringtone) is downloaded, the bridge 420 provides the location to store such content.

In one example, each bridge is user platform-specific. In another example, a user platform may not use a bridge 420. Further, each bridge 420 is not initially loaded onto a client device 13b. In this regard, a user of the client device 13b has the option to download the bridge 420 software to his client device 13b when desired.

Figure 5:
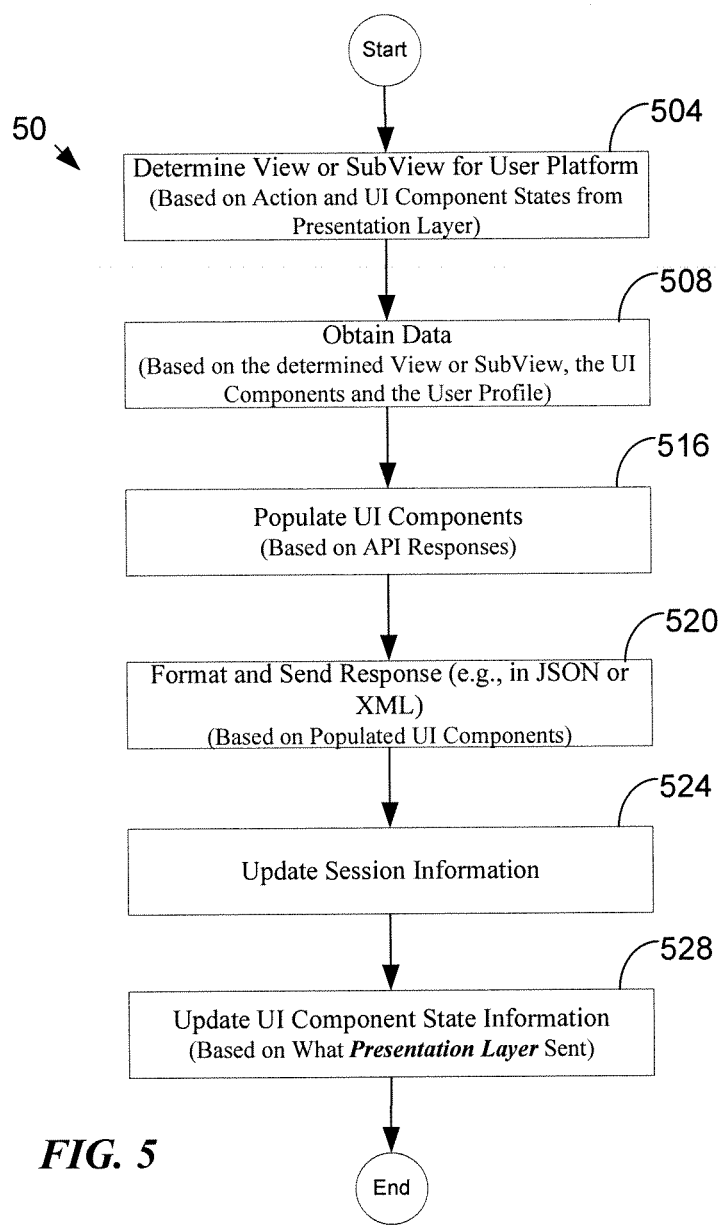
FIG. 5 illustrates an example of the X layer processing steps.

FIG. 5 illustrates an example of the X layer processing steps. The X layer is server side software that performs a number of functions. For example, it receives requests in JSON from the Presentation Layer 410. The X layer also consults the View Template Table 308 to determine how to honor the requests. Put differently, the X Layer uses the View Template Table to gather only the information needed for the browser of the device layer that sent the request for information. It provides a View tailored for a particular user platform. There are a set of business rules that are followed by the X layer. Business rules provide the sequence of events that are observed by the user at the Presentation Layer 410 (e.g., from the search page—to the buy page—to the confirmation page.) It calls for the appropriate system configuration management (SCM) real time APIs to obtain the data to process the request. Further, the X layer formulates the response (i.e., in JSON or XML) and sends it back to the Presentation Layer 410. It also regularly updates the session state it maintains.

In step 504, the View (or SubView) is determined for the user platform. This determination is based on Action and UI Component States from the Presentation Layer. Next, in step 508, the data is obtained. The data is obtained in the X layer by objects is referred to as "populators" that initiate API requests to CMP and fill in the specific component data. This step is based on the View (or SubView), the new UI Components, and the user platform.

In step 516 the UI Components are populated based on the API responses.

In step 520 the JSON response is formatted and sent to the device layer. Again, this information is based on the populated new UI Components.

When data is sent to the device layer from the X layer discussed above, the Presentation Layer of the client device takes that information and configures it into a format that can be displayed on the client device's browser. The real estate on each browser can vary greatly from one user platform to another. In this regard, the Presentation Layer does not determine what data needs to be sent to the UI. That job belongs to the X Layer.

Figure 6:
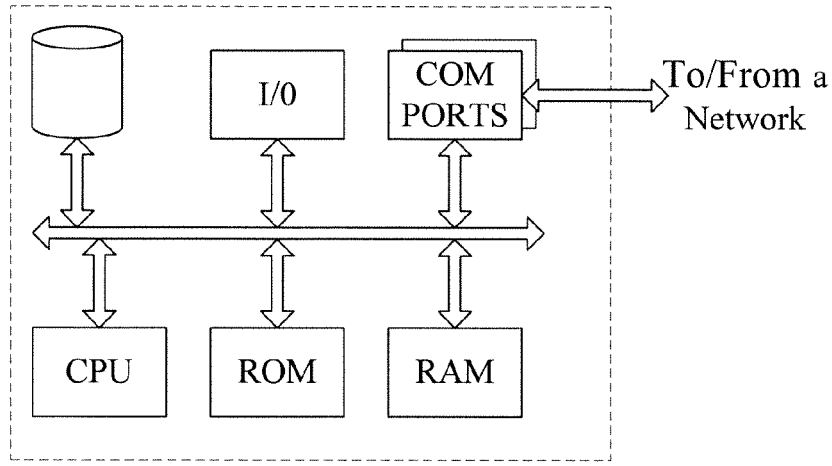
FIG. 6 illustrates a network or host computer.
Figure 7:
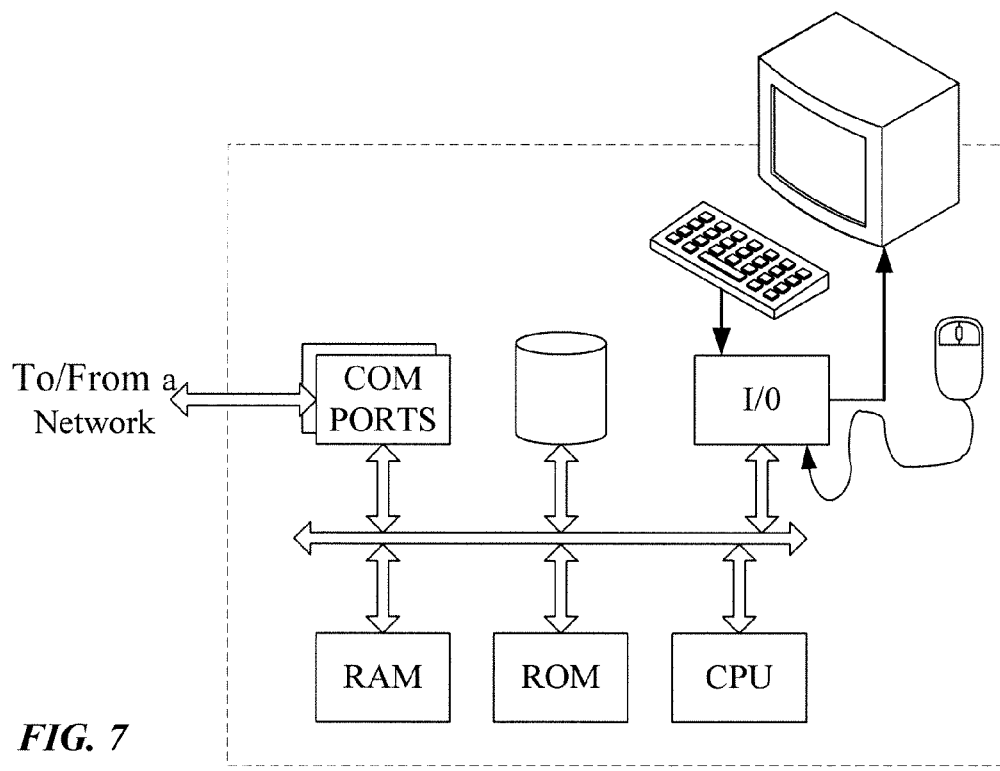
FIG. 7 depicts a computer with user interface elements.

FIGS. 6 and 7 provide functional block diagram illustrations of general purpose computer hardware. FIG. 6 illustrates a network or host computer, as may be used to implement a server. FIG. 7 depicts a computer with user interface elements, as may be used to implement a personal computer or other type of workstation or terminal device, although the computer of FIG. 7 may also act as a server if appropriately programmed. It is believed that those skilled in the art are familiar with the structure, programming, and general operation of such computer equipment and as a result, the drawings should be self-explanatory.

As known in the data processing and communications arts, a general-purpose computer may include a central processor or other processing device, an internal communication bus, various types of memory or storage media (RAM, ROM, EEPROM, cache memory, disk drives, etc.) for code and data storage, and one or more network interface cards or ports for communication purposes. The software functionalities involve programming, including executable code as well as associated stored data and content relating to affiliated web sites. The software code is executable by the general-purpose computer that functions as the server and/or that functions as a client device. In operation, the code is stored within the general-purpose computer. At other times, however, the software may be stored at other locations and/or transported for loading into the appropriate general-purpose computer system. Execution of such code by a processor or central proceeding unit of the computer enables the implementation of the techniques described herein, in essentially the manner performed in the implementations discussed and illustrated herein.

A server, for example, includes a data communication interface for packet data communication. The server also includes a central processing unit (CPU), in the form of one or more processors, for executing program instructions. The server may include an internal communication bus, program storage, and data storage for various data files to be processed and/or communicated by the server, although the server often receives programming and data via network communications. The hardware elements, operating systems, and programming languages of such servers and client devices are conventional in nature, and it is presumed that those skilled in the art are adequately familiar therewith. Of course, the server functions may be implemented in a distributed fashion on a number of similar platforms, to distribute the processing load.

Hence, aspects of the present methods outlined above may be embodied in programming. Program aspects of the technology may be thought of as "products" or "articles of manufacture" and may be in the form of executable code and/or associated data that is carried on or embodied in a type of machine-readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible, non-transitory "storage" media, terms such as computer or machine "readable medium" refer to any medium that participates in providing instructions to a processor for execution.

Hence, a machine-readable medium may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the social network method, etc., shown in the drawings. Volatile storage media include dynamic memory, such as main memory of such a computer. Tangible transmission media include coaxial cables, copper wire, and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It is intended that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX

Acronym List

The description above has used a large number of acronyms to refer to various services, messages, and system components. Although generally known, use of several of these acronyms is not strictly standardized in the art. For the convenience of the reader, the following list correlates terms to acronyms, as used by way of example in the detailed description above.

API—Application Programming Interface
CD-ROM—Compact Disc Read Only Memory
CMP—Catalogue Management Platform
CPU—Central Processing Unit
CSS—Cascading Style Sheet
DVD—Digital Video Disc
DVD-ROM—Digital Video Disc Read Only Memory
EPROM—Erasable Programmable Read Only Memory
FLASH-EPROM—Flash Erasable Programmable Read Only Memory
IT—Information Technology
JSON—JavaScript Object Notation
PROM—Programmable Read Only Memory
RAM—Random Access Memory
ROM—Read Only Memory

What is claimed is:

1. A method, comprising steps of:
receiving a request for an identified page of content from a client device, through a communication network, at a computer system configured as an application server;
identifying a user platform implemented by the client device, from among different user platforms supported by the application server;
retrieving, from a View Templates Table in storage accessible to a processor of the computer system, a View Template for the identified user platform, the View Template defining components available for the identified user platform from among a plurality of components, wherein:
each component references a respective centrally managed content element maintained independent from code formatting of the respective content element for any of the different user platforms;
each component comprises a user interface (UI) component definition including configuration information for formatting the respective referenced content element on a respective user platform; and
some number of the available components represent aspects of the identified page of content;
processing the retrieved View Template to produce a tailored View including the available components representing aspects of the identified page of content, the tailored View being in a lightweight text-based open standard format and sufficient to produce the identified page of content on the client device for presentation to a user via execution of the identified user platform, wherein each of the available components representing aspects of the identified page of content included in the tailored View comprises:
a user interface (UI) component definition including configuration information for formatting the respective referenced content element on the identified user platform; and
data associated with the respective referenced content element; and
transmitting the tailored View of the identified page of content through the communication network to the client device in the lightweight text-based open standard format.

2. The method of claim 1 wherein the lightweight text-based open standard format is one of:
JavaScript Object Notation (JSON); or
Extensible Markup Language (XML).

3. The method of claim 1, further comprising a step of downloading executable programming to the client device to enable a processor of the client device to process the UI component definitions in accordance with the associated data to produce the presentation of the identified page of content to the user via execution of the identified user platform.

4. The method of claim 1, wherein the processing step comprises:
manipulating objects of the tailored View via an application layer on the application server, the application layer including the tailored View, a Controller, and a Model; wherein:
the tailored View is encapsulated in an X layer with support from a system configuration management (SCM) real-time application programming interfaces (APIs); and
the Model comprises a collection of user interface (UI) components, wherein each UI component contributes to rendering a specific UI widget.

5. The method of claim 4, wherein the Controller:
receives the request for an identified page of content from a client device; and
instructs the Model and the tailored View to provide the identified page of content based on the received request.

6. The method of claim 4, wherein each UI component comprises (i) a configuration data part comprising customization information with respect to a default implementation of the UI component, and (ii) a data element comprising raw data to be sent to a Presentation Layer of the client device.

7. The method of claim 4, wherein the X layer determines what configuration data and what raw data to send in the tailored View to the client device.

8. The method of claim 4, further comprising the X Layer causing the computer system to perform the steps of:
determining the tailored View for the identified user platform;
obtaining data from the storage based on the tailored View, UI components, and a user profile;
populating the UI components based on information from the APIs;
formatting a response to be sent to the client device in the lightweight text-based open standard format;
sending the response to the client device;
updating a session information; and
updating a UI component state information.

9. The method of claim 8, wherein the lightweight text-based open standard format is one of:
JSON; or
XML.

10. A computer system configured as an application server, the computer system comprising:
a processor;
a network interface coupled to the processor configured to enable communications via a communication network;
a storage device for content and programming;
a program stored in the storage device, wherein execution of the program by the processor configures the computer system to perform functions, including functions to:
receive a request for an identified page of content from a client device, through a communication network, at a computer system configured as an application server;
identify a user platform implemented by the client device, from among different user platforms supported by the application server;
retrieve, from a View Templates Table in storage accessible to a processor of the computer system, a View Template for the identified user platform, the View Template defining components available for the identified user platform from among a plurality of components, wherein:
each component references a respective centrally managed content element maintained independent from code formatting of the respective content element for any of the different user platforms;
each component comprises a user interface (UI) component definition including configuration information for formatting the respective referenced content element on a respective user platform; and
some number of the available components represent aspects of the identified page of content;
process the retrieved View Template to produce a tailored View including the available components representing aspects of the identified page of content, the tailored View being in a lightweight text-based open standard format and sufficient to produce the identified page of content on the client device for presentation to a user via execution of the identified user platform, wherein each of the available components representing aspects of the identified page of content included in the tailored View comprises:
a user interface (UI) component definition including configuration information for formatting the respective referenced content element on the identified user platform; and
data associated with the respective referenced content element; and
transmit the tailored View of the identified page of content through the communication network to the client device in the lightweight text-based open standard format.

11. The system of claim 10, wherein the lightweight text-based open standard format is one of:
JavaScript Object Notation (JSON); or
Extensible Markup Language (XML).

12. The system of claim 10, wherein execution of the program by the processor further configures the computer system to download executable programming to the client device to enable a processor of the client device to process the UI component definitions in accordance with the associated data to produce the presentation of the identified page of content to the user via execution of the identified user platform.

13. The system of claim 10, wherein:
the program includes an application layer on the application server including the tailored View, a Controller, and a Model;
the process function causes the tailored View to be encapsulated in an X layer with support from a system configuration management (SCM) real-time application programming interfaces (APIs); and
the program includes the Model comprising a collection of user interface (UI) components, wherein each UI component contributes to rendering a specific UI widget.

14. The system of claim 13, wherein the Controller:
receives the request for an identified page of content from a client device; and
instructs the Model and the tailored View to provide the identified page of content based on the received request.

15. The system of claim 13, wherein each UI component comprises (i) a configuration data part comprising customization information with respect to a default implementation of the UI component, and (ii) a data element comprising raw data to be sent to a Presentation Layer of the client device.

16. The system of claim 15, wherein the X layer determines what configuration data and what raw data to send in the tailored View to the client device.

17. The system of claim 15, wherein the X Layer causes the computer system to perform functions, including functions to:
determine the tailored View for the identified user platform;
obtain data from the storage based on the tailored View, UI components, and a user profile;
populate UI components based on information from the APIs;
format a response to be sent to the client device in the lightweight text-based open standard format;
update a session information; and
update a UI component state information.

18. The system of claim 17, wherein the lightweight text-based open standard format is one of:
JSON; or
XML.

19. The method of claim 4, wherein the Model:
manages a behavior and data of an application domain;
responds to a request for information about a state of the Model; and
responds to an instruction to change the state of the Model.

20. The method of claim 19, wherein managing the behavior and data of the application domain by the Model includes determining which UI components to be included in the tailored View.

21. The system of claim 13, wherein the Model:
manages a behavior and data of an application domain;
responds to a request for information about a state of the Model; and
responds to an instruction to change the state of the Model.

22. The system of claim 21, wherein managing the behavior and data of the application domain by the Model includes determining which UI components to be included in the tailored View.

\* \* \* \* \*